United States Patent
Versteyhe et al.

(10) Patent No.: US 9,360,080 B2
(45) Date of Patent: *Jun. 7, 2016

(54) TORSIONAL COMPENSATOR

(71) Applicant: Dana Limited, Maumee, OH (US)

(72) Inventors: Mark R. J. Versteyhe, Oostkamp (BE); Stijn Goossens, Erpe-mere (BE)

(73) Assignee: Dana Limited, Maumee, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/204,835

(22) Filed: Mar. 11, 2014

(65) Prior Publication Data

US 2014/0260778 A1 Sep. 18, 2014

Related U.S. Application Data

(60) Provisional application No. 61/778,745, filed on Mar. 13, 2013.

(51) Int. Cl.
*F16D 3/12* (2006.01)
*F16F 15/12* (2006.01)

(52) U.S. Cl.
CPC ......... *F16F 15/1204* (2013.01); *Y10T 74/2121* (2015.01)

(58) Field of Classification Search
CPC .................... F16F 15/1204; Y10T 74/2121
USPC ................... 464/57, 60, 97; 123/192.1, 192.2
See application file for complete search history.

(56) References Cited

U.S. PATENT DOCUMENTS

| | | | | |
|---|---|---|---|---|
| 2,848,882 | A * | 8/1958 | Larsen et al. | 464/97 |
| 3,062,023 | A * | 11/1962 | Stolworthy | 464/97 |
| 5,857,388 | A * | 1/1999 | Killion et al. | 123/192.2 X |
| 2014/0261282 | A1 * | 9/2014 | Versteyhe et al. | 123/192.2 |

FOREIGN PATENT DOCUMENTS

| | | |
|---|---|---|
| DE | 10122541 A1 | 1/2002 |
| DE | 102011017548 A1 | 10/2012 |
| GB | 2294994 A | 5/1996 |

OTHER PUBLICATIONS

International Search Report with Written Opinion for PCT/US2014/023609.

* cited by examiner

*Primary Examiner* — Gregory Binda
(74) *Attorney, Agent, or Firm* — Marshall & Melhorn, LLC

(57) ABSTRACT

A parallel, torque additive torsional compensating device for an internal combustion engine is provided. The torsional compensating device comprises a first gear, a first joint assembly, an intermediate shaft, a second joint assembly, a torsional element, and a second gear. The first gear and the second gear are in respective driving engagement with a first engagement portion and a second engagement portion of an output of the engine. The intermediate shaft is in driving engagement with the first joint assembly and the second joint assembly. The torsional element is in driving engagement with the second joint assembly and the second gear. An angular deviation of at least one of the first joint assembly and the second joint assembly causes a cyclical acceleration of the torsional element. The cyclical acceleration applies a torque to the output of the internal combustion engine through the second gear and the second engagement portion.

15 Claims, 5 Drawing Sheets

TORSIONAL COMPENSATOR

RELATED APPLICATIONS

The present application claims the benefit of U.S. Provisional Application No. 61/778,745 filed on Mar. 13, 2013, which is incorporated herein in its entirety by reference.

FIELD OF THE INVENTION

The present invention relates to internal combustion engines and more specifically to a torsion based torque ripple compensating device for use with an internal combustion engine.

BACKGROUND OF THE INVENTION

Due to recent improvements in combustion engine technology, there has been a trend to downsize internal combustion engines used in vehicles. Such improvements also result in more efficient vehicle, while maintaining similar performance characteristics and vehicle form factors favoured by consumers One common improvement used with internal combustion engines is the addition of a supercharger or a turbocharger. Typically, the addition of the supercharger or the turbocharger is used to increase a performance of an engine that has been decreased in displacement or a number of engine cylinders. Such improvements typically result in an increased torque potential of the engine, enabling the use of longer gear ratios in a transmission of the vehicle. The longer gear ratios in the transmission enable engine down-speeding. Engine down-speeding is a practice of operating the engine at lower operating speeds. Such improvements typically result in improved fuel economy, operation near their most efficient level for a greater amount of time compared to conventional engines, and reduced engine emissions.

In some designs, however, engine down-speeding can result in an undesirable increase in torque ripple at low operating speeds of the engine. For example, a significantly increased torque ripple can appear at an engine output when the engine is operating at low idle speeds. The torque ripple is a well-known engine dynamic that results from torque not being delivered constantly, but periodically during each power stroke of the operating cycle of an internal combustion engine. FIG. 1 is a graph illustrating a torque output of an engine during a four stroke cycle of an engine. In the four stroke cycle, the torque ripple happens once every two turns of a crankshaft for each cylinder of the engine. Accordingly, a four cylinder engine will have two torque ripples per crankshaft turn while a three cylinder engine will have three ripples every two crankshaft turns.

An amplitude of the torque ripple also varies with an operating speed of the engine and a load applied to the engine. A phase of the torque ripple varies with a rotation of the engine. Torque ripples can cause many problems for components of the vehicle near the engine, such as but not limited to: increased stress on the components, increased wear on the components, and exposure of the components to severe vibrations. These problems can damage a powertrain of the vehicle and result in poor drivability of the vehicle. In order to reduce the effects of these problems, smooth an operation of the engine, and improve an overall performance of the engine, the torque ripples may be compensated for using an engine balancing method. Many known solutions are available for multi-cylinder engine configurations to reduce or eliminate the stresses and vibration caused by the torque ripples.

Torque ripple compensator devices are known in the art; however, the known device have many shortcomings. In many conventional vehicles, the torque ripples are compensated for using at least one flywheel. FIG. 2 illustrates a conventional flywheel based damping system. In other applications, a dual-mass flywheel system may be used. An inertia of the flywheel dampens a rotational movement of the crankshaft, which facilitates operation of the engine running at a substantially constant speed. Flywheels may also be used in combination with other dampers and absorbers.

A weight of the flywheel, however, can become a factor in such torque ripple compensating devices. A lighter flywheel accelerates faster but also loses speed quicker, while a heavier flywheel retain speeds better compared to the lighter flywheel, but the heavier flywheel is more difficult to slow down. However, a heavier flywheel provides a smoother power delivery, but makes an associated engine less responsive, and an ability to precisely control an operating speed of the engine is reduced.

In addition to a weight of the flywheel, another problem with conventional inertia and damping systems is a lack of adaptability. The conventional inertia and damping systems are designed for the worst operational condition and must be large enough to dampen vibrations at lower operating speeds. As a result, the conventional inertia and damping systems are not optimized for higher operating speeds, resulting in inadequate performance.

It would be advantageous to develop a torque ripple compensating device able to be passively or dynamically adapted for both an amplitude and a phase of a torque ripple while minimizing an interference with an operation of an internal combustion engine.

SUMMARY OF THE INVENTION

Presently provided by the invention, a torque ripple compensating device able to be passively or dynamically adapted for both an amplitude and a phase of a torque ripple while minimizing an interference with an operation of an internal combustion engine, has surprisingly been discovered.

In one embodiment, the present invention is directed to a torsional compensating device for an internal combustion engine. The torsional compensating device comprises a first joint assembly and a torsional element. The first joint assembly is in driving engagement with an output of the internal combustion engine. The torsional element is in driving engagement with the first joint assembly and the output of the internal combustion engine. An angular deviation of the first joint assembly causes a cyclical acceleration of the torsional element. The cyclical acceleration of the torsional element applies a torque to the output of the internal combustion engine.

In another embodiment, the present invention is directed to a torsional compensating device for an internal combustion engine. The torsional compensating device comprises a first Cardan joint assembly and a torsional element. The first Cardan joint assembly is in driving engagement with an output of the internal combustion engine. The torsional element is in driving engagement with the first Cardan joint assembly and the output of the internal combustion engine. The torsional element is oriented substantially parallel to the output of the internal combustion engine. An angular deviation of the first Cardan joint assembly causes a cyclical acceleration of the torsional element. The cyclical acceleration of the torsional element applies a torque to the output of the internal combustion engine.

In yet another embodiment, the present invention is directed to a torsional compensating device for an internal combustion engine. The torsional compensating device comprises a first Cardan joint assembly, a second joint assembly, a clutching device, and a torsional element. The first Cardan joint assembly is in driving engagement with an output of the internal combustion engine. The second joint assembly is in driving engagement with the first Cardan joint assembly. The clutching device is in driving engagement with the second joint assembly. The torsional element is in driving engagement with the clutching device and the output of the internal combustion engine. The torsional element is oriented substantially parallel to the output of the internal combustion engine. An angular deviation of the first Cardan joint assembly causes a cyclical acceleration of the torsional element. The cyclical acceleration of the torsional element applies a torque to the output of the internal combustion engine.

Various aspects of this invention will become apparent to those skilled in the art from the following detailed description of the preferred embodiment, when read in light of the accompanying drawings.

BRIEF DESCRIPTION OF THE FIGURES

The above, as well as other advantages of the present invention will become readily apparent to those skilled in the art from the following detailed description when considered in the light of the accompanying drawings in which.

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
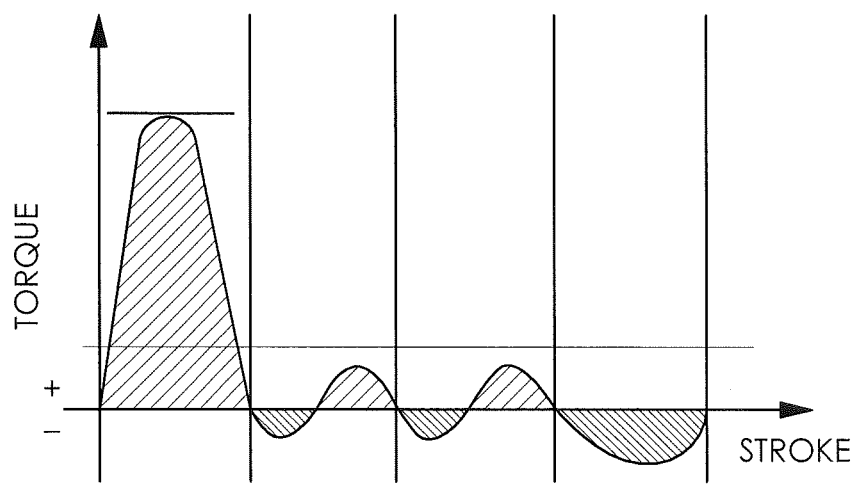
FIG. 1 is a graph illustrating a torque output of an engine during a four stroke cycle of an engine.
Figure 2:
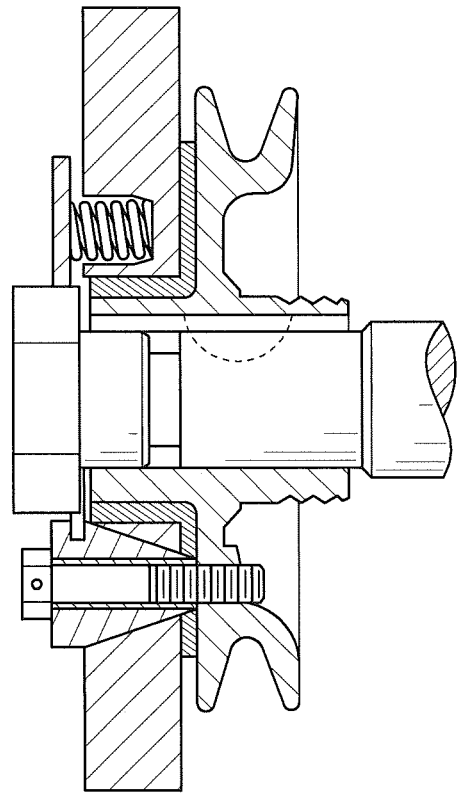
FIG. 2 is a sectional view of a flywheel based damping system known in the prior art.
Figure 3A:
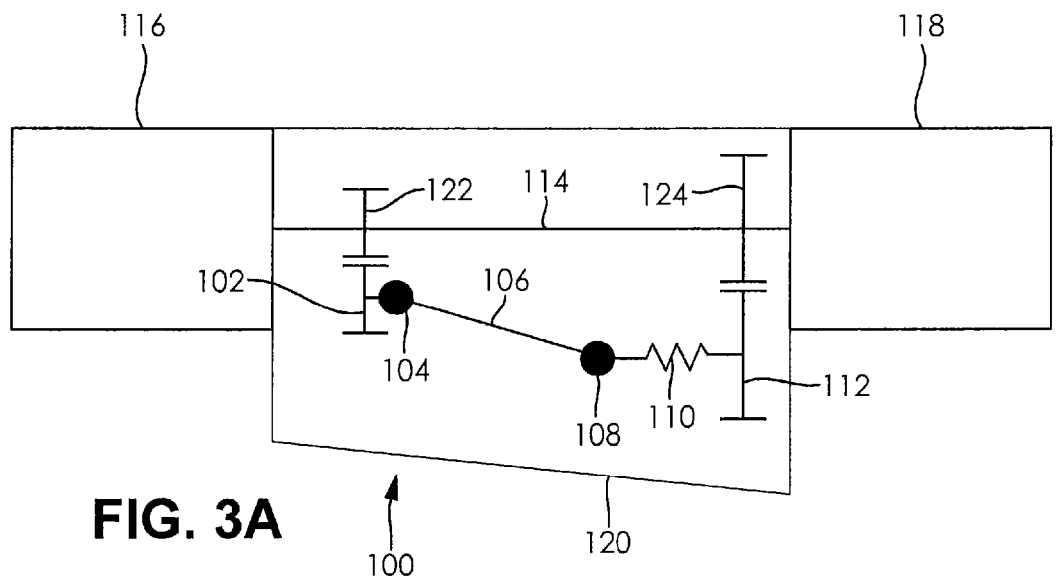
FIG. 3A is a schematic illustration of a torsional compensating device according to a first embodiment of the present invention.

FIG. 3A illustrates a torsional compensating device 100. The torsional compensating device 100 comprises a first gear 102, a first joint assembly 104, an intermediate shaft 106, a second joint assembly 108, a torsional element 110, and a second gear 112. The torque ripple compensating device 100 is in driving engagement with a main shaft 114 of an internal combustion engine 116. The main shaft 114 is also in driving engagement with a transmission 118. The torsional compensating device 100 is rotatably disposed in a housing 120 between the internal combustion engine 116 and the transmission 118; however, it is understood that the torsional compensating device 100 may be disposed in a portion of the internal combustion engine 116 or the transmission 118. The internal combustion engine 116, the torque compensating device 100, and the transmission 118 form a portion of a vehicle (not shown); however, it is understood that the torque compensating device 100 may be used with an internal combustion engine in other applications. The first gear 102 and the second gear 112 of the torsional compensating device 100 are each in driving engagement with the main shaft 114 of the internal combustion engine 116.

The internal combustion engine 116 applies power to the main shaft 114 through a crankshaft (not shown). The internal combustion engine 116, for example, is a four cycle internal combustion engine; however, it is understood that the internal combustion engine 116 may be another type of internal combustion engine that generates a torque ripple. It is understood that the internal combustion engine 116 may be a hybrid power source including both an internal combustion engine and an electric motor.

The main shaft 114 is in driving engagement with the internal combustion engine 116 and a transmission 118. The main shaft 114 may form a portion of one of the internal combustion engine 116 and the transmission 118, or the main shaft 114 may be formed separate therefrom. The main shaft 114 is in driving engagement with the internal combustion engine 116 and the transmission 118 through splined connections formed on each end thereof; alternately, it is understood that the main shaft 114 may be in driving engagement with the internal combustion engine 116 and the transmission 118 in any other conventional manner. The main shaft 114 includes a first geared portion 122 and a second geared portion 124.

The first geared portion 122 is in driving engagement with the main shaft 114 through a splined connection; alternately, it is understood that the first geared portion 122 may be in driving engagement with the main shaft 114 in any other conventional manner. The first geared portion 122 is a spur gear in driving engagement with the first gear 102 of the torsional compensating device 100; however, it is understood that the first geared portion 122 may be in driving engagement with the first gear 102 of the torsional compensating device 100 through another type of gearing.

The second geared portion 124 is in driving engagement with the main shaft 114 through a splined connection; alternately, it is understood that the second geared portion 124 may be in driving engagement with the main shaft 114 in any other conventional manner. The second geared portion 124 is a spur gear in driving engagement with the second gear 112 of the torsional compensating device 100; however, it is understood that the second geared portion 124 may be in driving engagement with the second gear 112 of the torsional compensating device 100 through another type of gearing.

The transmission 118 facilitates driving engagement between the main shaft 114 of the internal combustion engine 116 and a ground engaging device (not shown) in a plurality of drive ratios. The transmission 118 may be an automatic transmission, a manual transmission, a continuously variable transmission, or another type of transmission. As known in the art, the transmission 118 may include a clutching device (not shown).

The first gear 102 is rotatably disposed within the housing 120. The first gear 102 is rotatably supported by bearings (not shown). The first gear 102 is a spur gear in driving engagement with the first gear portion 122 of the main shaft 114; however, it is understood that the first gear 102 may be in driving engagement with the first gear portion 122 of the main shaft 114 through another type of gearing. The first gear 102 in driving engagement with the first gear portion 122 forms a first drive ratio. The first gear 102 is also in driving engagement with the first joint assembly 104. The first gear 102 is in driving engagement with the first joint assembly 104 through a splined connection; however, it is understood that the first gear 102 may be unitarily formed with the first joint assembly 104 or that the first gear 102 may be in driving engagement with the first joint assembly 104 in any conventional manner.

The first joint assembly 104 facilitates driving engagement between the first gear 102 and first intermediate shaft 106. The first joint assembly 104 may be a homokinetic or a non-homokinetic joint assembly. When the first joint assembly 104 is a non-homokinetic joint assembly, the first joint assembly 104 may be a Cardan joint assembly, as described hereinabove. Further, it is understood that when the first joint assembly 104 is a non-homokinetic joint assembly, the first joint assembly 104 may be any type of non-homokinetic joint. When the first joint assembly 104 is a homokinetic joint assembly, the first joint assembly 104 may be a constant velocity joint assembly, which is conventional and well known in the art. Further, it is understood that when the first joint assembly 104 is a homokinetic joint assembly, the first joint assembly 104 may be any type of homokinetic joint. For simplicity, the components of the first joint assembly 104 are represented schematically in FIG. 3A.

Figure 3B:
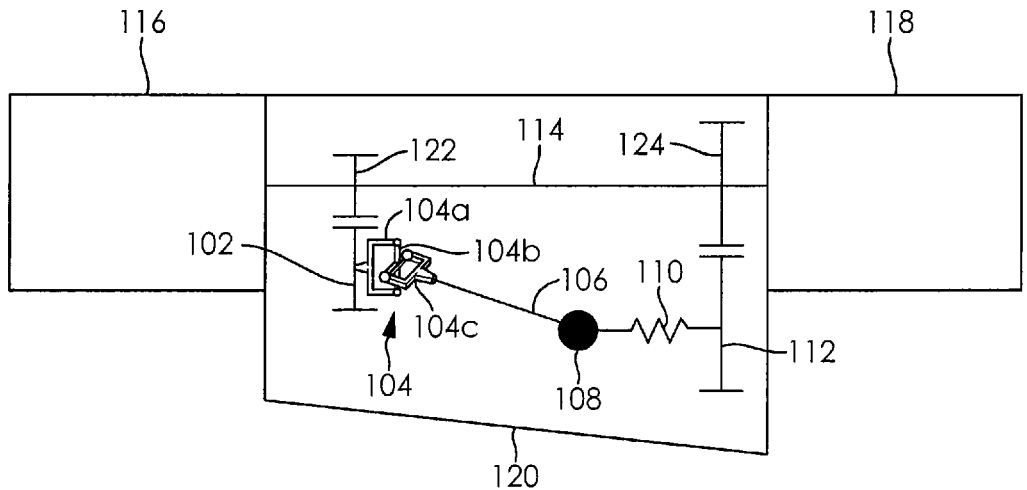
FIG. 3B is a schematic illustration of a variation of the torsional compensating device shown in FIG. 3A.

FIG. 3B is a schematic illustration of a variation of the torsional compensating device shown in FIG. 3A, wherein the first joint assembly 104 is a Cardan joint assembly. When the first joint assembly 104 is a Cardan joint assembly, the first joint assembly 104 comprises a first driving yoke 104a, a first cross-shaft 104b, and a first driven yoke 104c. The Cardan joint assembly is conventional and well known in the art. The first joint assembly 104 facilitates driving engagement between the first gear 102 and the intermediate shaft 106. In the first joint assembly 104, a relation between the first driving yoke 104a and the first driven yoke 104c may be described using the following equation:

$$\tan(\beta_1) = \cos(\theta)\tan(\beta)$$

In the above equation, θ is the angle between the first driving yoke 104a and the first driven yoke 104c, β is the angle of rotation of the first driving yoke 104a and is the angle of rotation of the first driven yoke 104c. Furthermore, as the angles of rotation are different for the first driving yoke 104a and the first driven yoke 104c, the rotation speeds and accelerations will also be slightly different. The relation between the two rotational speeds is the following:

$$\omega_1 = \frac{\omega \cos(\theta)}{1 - \sin^2(\beta)\sin^2(\theta)}$$

In the above equation, ω is the rotational speed of the first driving yoke 104a and $\omega_1$ is the rotational speed of the first driven yoke 104c. A speed difference and an acceleration of the first driven yoke 104c may be described using a second order phenomenon (sinusoidal with a period of 180°).

The first driving yoke 104a is a rigid member in driving engagement with the first gear 102 and the first cross-shaft 104b. The first driving yoke 104a is a substantially U-shaped member, but it is understood that the first driving yoke 104a may have other shapes. The first driving yoke 104a defines a pivot point which the first cross-shaft 104b is rotatably coupled to.

The first cross-shaft 104b is a rigid member in driving engagement with the first driving yoke 104a and the first driven yoke 104c. The first cross-shaft 104b is a cross shaped member comprising a pair of primary trunnions and a pair of secondary trunnions, oriented transversely to one another. The first driving yoke 104a is rotatably coupled to the primary trunnions of the first cross-shaft 104b and the first driven yoke 104c is rotatably coupled to the secondary trunnions of the first cross-shaft 104b. Bearings (not shown) may be disposed between each of the trunnions and the first driving yoke 104a and the first driven yoke 104c.

The first driven yoke 104c is a rigid member in driving engagement with the first cross shaft 104b and the intermediate shaft 106. The first driven yoke 104c is a substantially U-shaped member, but it is understood that the first driven yoke 104c may have other shapes. The first driven yoke 104c defines a pivot point which the first cross-shaft 104b is rotatably coupled to.

The intermediate shaft 106 is rotatably disposed within the housing 120. The intermediate shaft 106 may be rotatably supported by bearings (not shown). The intermediate shaft 106 is a rigid member in driving engagement with the first joint assembly 104 and the second joint assembly 108. The intermediate shaft 106 is in driving engagement with the first joint assembly 104 through a splined connection; however, it is understood that the intermediate shaft 106 may be unitarily formed with the first joint assembly 104 or that the intermediate shaft 106 may be in driving engagement with the first joint assembly 104 in any conventional manner. The intermediate shaft 106 is in driving engagement with the second joint assembly 108 through a splined connection; however, it is understood that the intermediate shaft 106 may be unitarily formed with the second joint assembly 108 or that the intermediate shaft 106 may be in driving engagement with the second joint assembly 108 in any conventional manner. It is also understood that in embodiments of the invention not shown, the torsional compensating device 100 may not include the intermediate shaft 106. In such embodiments, the first joint assembly 104 is directly drivingly engaged with the second joint assembly 108.

The second joint assembly 108 facilitates driving engagement between the intermediate shaft 106 and the torsional element 110. The second joint assembly 108 may be a homokinetic or a non-homokinetic joint assembly. When the second joint assembly 108 is a non-homokinetic joint assembly, the second joint assembly 108 may be a Cardan joint assembly, as described hereinabove. Further, it is understood that when the second joint assembly 108 is a non-homokinetic joint assembly, the second joint assembly 108 may be any type of non-homokinetic joint. When the second joint assembly 108 is a homokinetic joint assembly, the second joint assembly 108 may be a constant velocity joint assembly, which is conventional and well known in the art. Further, it is understood that when the second joint assembly 108 is a homokinetic joint assembly, the second joint assembly 108 may be any type of homokinetic joint. For simplicity, the components of the second joint assembly 108 are represented schematically in FIG. 3A.

Figure 3C:
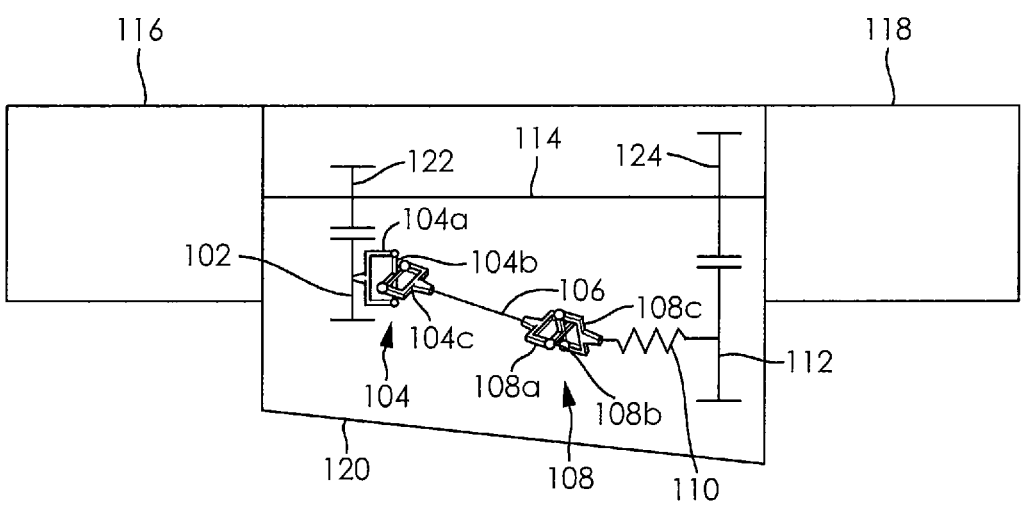
FIG. 3C is a schematic illustration of a variation of the torsional compensating device shown in FIG. 3A.

FIG. 3C is a schematic illustration of a variation of the torsional compensating device shown in FIG. 3A, wherein the first joint assembly 104 and the second joint assembly 108 are Cardan joint assemblies. When the second joint assembly 108 is a Cardan joint assembly, the second joint assembly 108 comprises a second driving yoke 108a, a second cross-shaft 108b, and a second driven yoke 108c. When the joint assemblies 104, 108 are Cardan joint assemblies, it is understood that the second joint assembly 108 is not phased in relation to the first joint assembly 104 to cancel a speed difference and a cyclical acceleration of the intermediate shaft 106, and thus the torsional element 110, caused by the first joint assembly 104. Further, it is understood that the second joint assembly 108 may be phased similarly to the first joint assembly 104 or that the second joint assembly 108 may be phased partially similar to the first joint assembly 104. An angle of the second joint assembly 108 is substantially equal to an angle of the first joint assembly 104.

When one of the joint assemblies 104, 108 is not a Cardan joint assembly, it is understood that at least one of the joint assemblies 104, 108 is not phased in relation to a remaining one of the joint assemblies 104, 108. Phasing one of the joint assemblies 104, 108 in relation to a remaining one of the joint assemblies 104, 108 may be performed by selecting a non-homokinetic joint as one of the joint assemblies 104, 108.

The torsional element 110 is a semi-rigid member in driving engagement with the second joint assembly 108 and the second gear 112. The torsional element 110 is oriented substantially parallel to the main shaft 114. The torsional element 110 comprises a torsion bar or a torsion spring to facilitate an angular deviation between the second joint assembly 108 and the second gear 112. In response to the angular deviation between the second joint assembly 108 and the second gear 112, the torsional element 110 generates a torque, which is applied to the second gear 112. The following equation may be used to calculate a torque generated by the torsional element 110:

$$T = K \cdot \Delta(\beta)$$

in which T is the torque generated by the torsional element 110, $\Delta(\beta)$ is an angular deviation applied to the torsional element 110 through the first joint assembly 104 and the second joint assembly 108, and K is a spring constant associated with the torsional element 110.

As the angular deviation generated by the first joint assembly 104 and the second joint assembly 108 is a second order deviation, the torque generated by the torsional element 110 will be a second order torque oscillation. The torque generated by the torsional element 110 is used to damp a torque ripple produced by the internal combustion engine 116. As a non-limiting example, a four-cylinder internal combustion engine produces a greatest torque ripple four times for every two rotations of the internal combustion engine, thus such a torque ripple may be described as a second order torque peak.

The second gear 112 is rotatably disposed within the housing 120. The second gear 112 is rotatably supported by bearings (not shown). The second gear 112 is a spur gear in driving engagement with the second gear portion 124 of the main shaft 114; however, it is understood that the second gear 112 may be in driving engagement with the second gear portion 124 of the main shaft 114 through another type of gearing. The second gear 112 in driving engagement with the second gear portion 124 forms a second drive ratio. It is understood that the second drive ratio is equal to the first drive ratio. The second gear 112 is also in driving engagement with the first joint assembly 104. The first gear 102 is in driving engagement with the first torsional element 110 through a splined connection; however, it is understood that the second gear 112 may be unitarily formed with the torsional element 110 or that the second gear 112 may be in driving engagement with the torsional element 110 in any conventional manner.

Figure 4A:
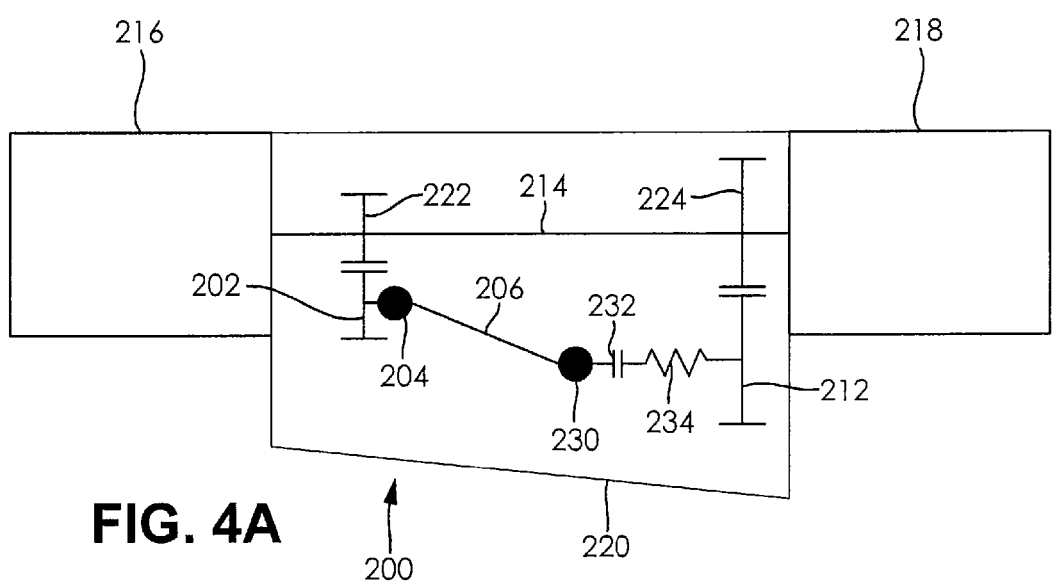
FIG. 4A is a schematic illustration of a torsional compensating device according to a second embodiment of the present invention.

FIG. 4A illustrates a torsional compensating device 200. The torque ripple compensating device 200 is a variation of the torque ripple compensating device 100, and has similar features thereto. The variation of the invention shown in FIG. 4A includes similar components to the torque ripple compensating device 100 illustrated in FIG. 3A. Similar features of the variation shown in FIG. 4A are numbered similarly in series, with the exception of the features described below.

The torsional compensating device 200 comprises a first gear 202, a first joint assembly 204, an intermediate shaft 206, a second joint assembly 230, a clutching device 232, a torsional element 234, and a second gear 212. The torque ripple compensating device 200 is in driving engagement with a main shaft 214 of an internal combustion engine 216. The main shaft 214 is also in driving engagement with a transmission 218. The torsional compensating device 200 is rotatably disposed in a housing 220 between the internal combustion engine 216 and the transmission 218; however, it is understood that the torsional compensating device 200 may be disposed in a portion of the internal combustion engine 216 or the transmission 218. The internal combustion engine 216, the torque compensating device 200, and the transmission 218 form a portion of a vehicle (not shown); however, it is understood that the torque compensating device 200 may be used with an internal combustion engine in other applications. The first gear 202 and the second gear 212 of the torsional compensating device 200 are each in driving engagement with the main shaft 214 of the internal combustion engine 216.

The second joint assembly 230 facilitates driving engagement between the intermediate shaft 206 and the clutching device 232. The second joint assembly 230 may be a homokinetic or a non-homokinetic joint assembly. When the second joint assembly 230 is a non-homokinetic joint assembly, the second joint assembly 230 may be a Cardan joint assembly, as described hereinabove. Further, it is understood that when the second joint assembly 230 is a non-homokinetic joint assembly, the second joint assembly 230 may be any type of non-homokinetic joint. When the second joint assembly 230 is a homokinetic joint assembly, the second joint assembly 230 may be a constant velocity joint assembly, which is conventional and well known in the art. Further, it is understood that when the second joint assembly 230 is a homokinetic joint assembly, the second joint assembly 230 may be any type of homokinetic joint. For simplicity, the components of the second joint assembly 230 are represented schematically in FIG. 3A.

Figure 4B:
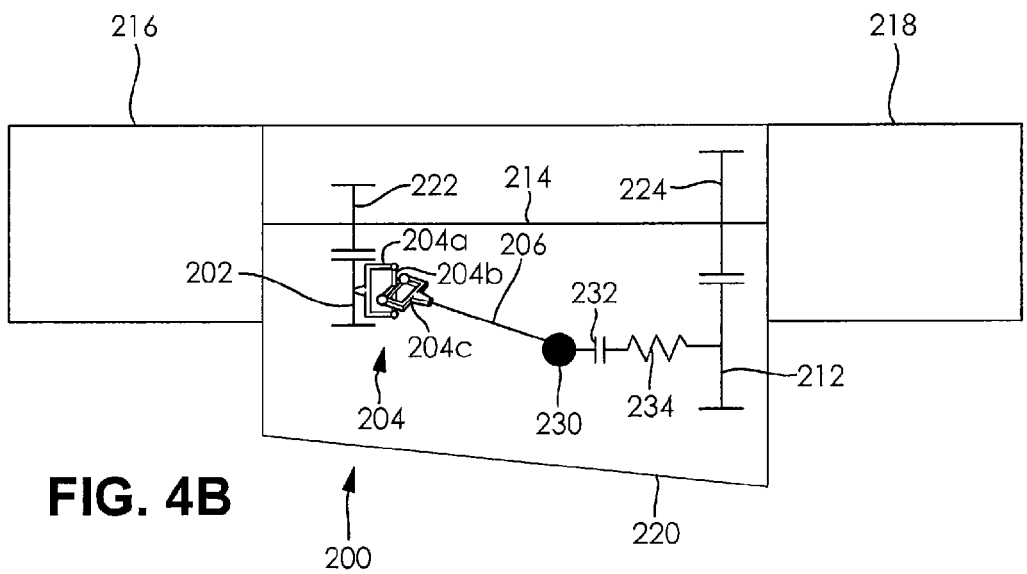
FIG. 4B is a schematic illustration of a variation of the torsional compensating device shown in FIG. 4A.

FIG. 4B is a schematic illustration of a variation of the torsional compensating device shown in FIG. 4A, wherein the first joint assembly 204 is a Cardan joint assembly. When the first joint assembly 204 is a Cardan joint assembly, the first joint assembly 204 comprises a first driving yoke 204a, a first cross-shaft 204b, and a first driven yoke 204c.

Figure 4C:
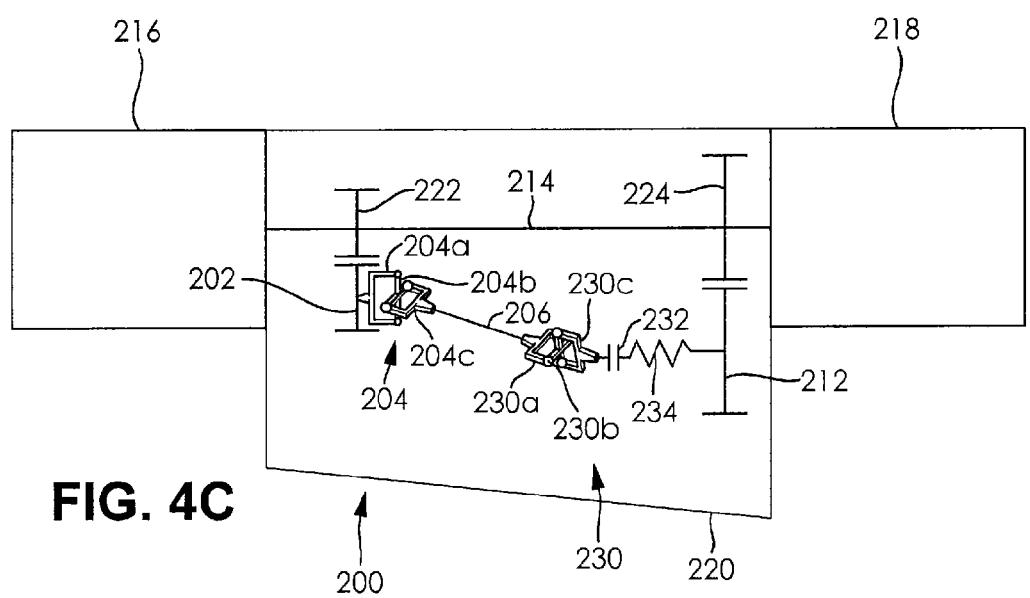
FIG. 4C is a schematic illustration of a variation of the torsional compensating device shown in FIG. 4A.

FIG. 4C is a schematic illustration of a variation of the torsional compensating device shown in FIG. 4A, wherein the first joint assembly 204 and the second joint assembly 230 are Cardan joint assemblies. When the second joint assembly 230 is a Cardan joint assembly, the second joint assembly 230 comprises a second driving yoke 230a, a second cross-shaft 230b, and a second driven yoke 230c.

When the joint assemblies 204, 230 are Cardan joint assemblies, it is understood that the second joint assembly 230 is not phased in relation to the first joint assembly 204 to cancel a speed difference and a cyclical acceleration of the intermediate shaft 206, and thus the torsional element 234, caused by the first joint assembly 204. Further, it is understood that the second joint assembly 230 may be phased similarly to the first joint assembly 204 or that the second joint assembly 230 may be phased partially similar to the first joint assembly 204. An angle of the second joint assembly 230 is substantially equal to an angle of the first joint assembly 204.

When one of the joint assemblies 204, 230 is not a Cardan joint assembly, it is understood that at least one of the joint assemblies 204, 230 is not phased in relation to a remaining one of the joint assemblies 204, 230. Phasing one of the joint assemblies 204, 230 in relation to a remaining one of the joint assemblies 204, 230 may be performed by selecting a non-homokinetic joint as one of the joint assemblies 204, 230.

The clutching device 232 facilitates variable driving engagement between the second joint assembly 230 and the torsional element 234; however, it is understood that the clutching device 232 may be positioned at another location in the torsional compensating device 200. The clutching device 232 is a plate style clutch; however, it is understood that the clutching device 232 may be a cone style clutch or another type of clutching device that can be variably engaged. The clutching device 232 is in communication with a control system (not shown) to control an engagement level of the clutching device 232. Typically, the clutching device 232 is in an engaged position and the clutching device 232 is only variably engaged to adjust a relationship between the second joint assembly 230 and the torsional element 234. When the relationship between the second joint assembly 230 and the torsional element 234 is adjusted, the clutching device 232 is placed in a "slipping" condition. Typically, the relationship between the second joint assembly 230 and the torsional element 234 is adjusted in very small increments.

Further, it is understood that by disengaging the clutching device 232, a torque generated by the torsional compensating device 200 can be eliminated. Disengaging the clutching device 232 may be preferable at higher operating speeds of the internal combustion engine 216, when a torque ripple produced by the internal combustion engine 216 is less severe, for example.

The torsional element 234 is a semi-rigid member in driving engagement with the second joint assembly 230 and the second gear 212. The torsional element 234 is oriented substantially parallel to the main shaft 214. The torsional element 234 comprises a torsion bar or a torsion spring to facilitate an angular deviation between the clutching device 232 and the second gear 212. In response to the angular deviation between the second joint assembly 230 and the second gear 212, the torsional element 234 generates a torque, which is applied to the second gear 212. The equation presented above may be used to calculate a torque generated by the torsional element 234.

As the angular deviation generated by the first joint assembly 204 and the second joint assembly 230 is a second order deviation, the torque generated by the torsional element 234 will be a second order torque oscillation. The torque generated by the torsional element 234 is used to damp a torque ripple produced by the internal combustion engine 216. As a non-limiting example, a four-cylinder internal combustion engine produces a greatest torque ripple four times for every two rotations of the internal combustion engine, thus such a torque ripple may be described as a second order torque peak.

Figure 5:
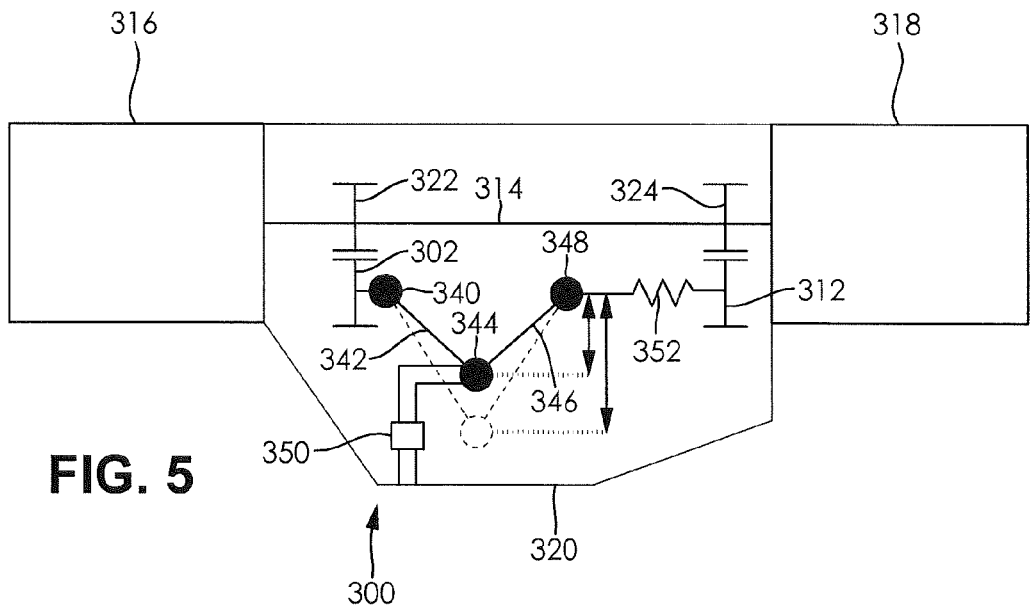
FIG. 5 is a schematic illustration of a torsional compensating device according to a third embodiment of the present invention.

FIG. 5 illustrates a torsional compensating device 300. The torque ripple compensating device 300 is a variation of the torque ripple compensating device 100, and has similar features thereto. The variation of the invention shown in FIG. 5 includes similar components to the torque ripple compensating device 100 illustrated in FIG. 3A. Similar features of the variation shown in FIG. 5 are numbered similarly in series, with the exception of the features described below.

The torsional compensating device 300 comprises a first gear 302, a first joint assembly 340, a first intermediate shaft 342, a second joint assembly 344, a second intermediate shaft 346, a third joint assembly 348, a joint actuator 350, a torsional element 352, and a second gear 312. The torque ripple compensating device 300 is in driving engagement with a main shaft 314 of an internal combustion engine 316. The main shaft 314 is also in driving engagement with a transmission 318. The torsional compensating device 300 is rotatably disposed in a housing 320 between the internal combustion engine 316 and the transmission 318; however, it is understood that the torsional compensating device 300 may be disposed in a portion of the internal combustion engine 316 or the transmission 318. The internal combustion engine 316, the torque compensating device 300, and the transmission 318 form a portion of a vehicle (not shown); however, it is understood that the torque compensating device 300 may be used with an internal combustion engine in other applications. The first gear 302 and the second gear 312 of the torsional compensating device 300 are each in driving engagement with the main shaft 314 of the internal combustion engine 316.

The first joint assembly 340 facilitates driving engagement between the first gear 302 and first intermediate shaft 342. The first joint assembly 340 may be a homokinetic or a non-homokinetic joint assembly. When the first joint assembly 340 is a non-homokinetic joint assembly, the first joint assembly 340 may be a Cardan joint assembly, as described hereinabove. Further, it is understood that when the first joint assembly 340 is a non-homokinetic joint assembly, the first joint assembly 340 may be any type of non-homokinetic joint. When the first joint assembly 340 is a homokinetic joint assembly, the first joint assembly 340 may be a constant velocity joint assembly, which is conventional and well known in the art. Further, it is understood that when the first joint assembly 340 is a homokinetic joint assembly, the first joint assembly 340 may be any type of homokinetic joint.

The first intermediate shaft 342 is rotatably disposed within the housing 320. The first intermediate shaft 342 may be rotatably supported by bearings (not shown). The first intermediate shaft 342 is a rigid member in driving engagement with the first joint assembly 340 and the second joint assembly 344. The first intermediate shaft 342 is a telescoping shaft which facilitates adjusting a position of the second joint assembly 344 with respect to the first joint assembly 340. The first intermediate shaft 342 is in driving engagement with the first joint assembly 340 through a splined connection; however, it is understood that the first intermediate shaft 342 may be unitarily formed with the first joint assembly 340 or that the first intermediate shaft 342 may be in driving engagement with the first joint assembly 340 in any conventional manner. The first intermediate shaft 342 is in driving engagement with the second joint assembly 344 through a splined connection; however, it is understood that the first intermediate shaft 342 may be unitarily formed with the second joint assembly 344 or that the first intermediate shaft 342 may be in driving engagement with the second joint assembly 344 in any conventional manner. It is also understood that in embodiments of the invention not shown, the torsional compensating device 300 may not include the first intermediate shaft 342. In such embodiments, the first joint assembly 340 is directly drivingly engaged with the second joint assembly 344 in a telescoping manner.

The second joint assembly 344 facilitates driving engagement between the first intermediate shaft 342 and the second intermediate shaft 346. The second joint assembly 344 may be a homokinetic or a non-homokinetic joint assembly. When the second joint assembly 344 is a non-homokinetic joint assembly, the second joint assembly 344 may be a Cardan joint assembly, as described hereinabove. Further, it is understood that when the second joint assembly 344 is a non-homokinetic joint assembly, the second joint assembly 344 may be any type of non-homokinetic joint. When the second joint assembly 344 is a homokinetic joint assembly, the second joint assembly 344 may be a constant velocity joint assembly, which is conventional and well known in the art. Further, it is understood that when the second joint assembly 344 is a homokinetic joint assembly, the second joint assembly 344 may be any type of homokinetic joint.

The second intermediate shaft 346 is rotatably disposed within the housing 320. The second intermediate shaft 346 may be rotatably supported by bearings (not shown). The second intermediate shaft 346 is a rigid member in driving engagement with the second joint assembly 344 and the third joint assembly 348. The second intermediate shaft 346 is a telescoping shaft which facilitates adjusting a position of the second joint assembly 344 with respect to the third joint assembly 348. The second intermediate shaft 346 is in driving engagement with the second joint assembly 344 through a splined connection; however, it is understood that the second intermediate shaft 346 may be unitarily formed with the second joint assembly 344 or that the second intermediate shaft 346 may be in driving engagement with the second joint assembly 344 in any conventional manner. The second intermediate shaft 346 is in driving engagement with the third joint assembly 348 through a splined connection; however, it is understood that the second intermediate shaft 346 may be unitarily formed with the third joint assembly 348 or that the second intermediate shaft 346 may be in driving engagement with the third joint assembly 348 in any conventional manner. It is also understood that in embodiments of the invention not shown, the torsional compensating device 300 may not include the second intermediate shaft 346. In such embodiments, the second joint assembly 344 is directly drivingly engaged with the third joint assembly 348 in a telescoping manner.

The third joint assembly 348 facilitates driving engagement between the second intermediate shaft 346 and the torsional element 352. The third joint assembly 348 may be a homokinetic or a non-homokinetic joint assembly. When the third joint assembly 348 is a non-homokinetic joint assembly, the third joint assembly 348 may be a Cardan joint assembly, as described hereinabove. Further, it is understood that when the third joint assembly 348 is a non-homokinetic joint assembly, the third joint assembly 348 may be any type of non-homokinetic joint. When the third joint assembly 348 is a homokinetic joint assembly, the third joint assembly 348 may be a constant velocity joint assembly, which is conventional and well known in the art. Further, it is understood that when the third joint assembly 348 is a homokinetic joint assembly, the third joint assembly 348 may be any type of homokinetic joint.

It is understood that at least one of the second joint assembly 344 and the third joint assembly 348 is not phased in relation to the first joint assembly 340. Phasing one of the second joint assembly 344 and the third joint assembly 348 in relation to the first joint assembly 340 may be performed by selecting a non-homokinetic joint as at least one of the first joint assembly 340, the second joint assembly 344, and the third joint assembly 348; however, it is understood that the two or all of the joint assemblies 340, 344, 348 may be non-homokinetic joints, as long as the joint assemblies 340, 344, 348 are arranged to not cancel a speed difference and an acceleration of a portion of the third joint assembly 348 in driving engagement with the torsional element 352 compared to a portion of the first joint assembly 340 in driving engagement with the first gear 202.

The torsional element 352 is a semi-rigid member in driving engagement with the third joint assembly 348 and the second gear 312. The torsional element 352 is oriented substantially parallel to the main shaft 314. The torsional element 352 comprises a torsion bar or a torsion spring to facilitate an angular deviation between the third joint assembly 348 and the second gear 312. In response to the angular deviation between the third joint assembly 348 and the second gear 312, the torsional element 352 generates a torque, which is applied to the second gear 312. The equation presented above may be used to calculate a torque generated by the torsional element 352.

The joint actuator 350 is an actuator in driving engagement with the second joint assembly 344 and the housing 320. The joint actuator 350 may be a hydraulic actuator, a pneumatic actuator, a screw driven actuator, or any other type of known actuator. In response to a control signal from a controller (not shown), the joint actuator 350 applies a force to the second joint assembly 344 to move the second joint assembly 344 with respect to the first joint assembly 340 and the third joint assembly 348, changing an angle of each of the joint assemblies 340, 344, 348 and a length of the intermediate shafts 342, 346. In response to the second joint assembly 344 being moved with respect to the first joint assembly 340 and the third joint assembly 348, a speed difference and an acceleration of a portion of the third joint assembly 348 is adjusted compared to a portion of the first joint assembly 340 in driving engagement with the first gear 202, thus changing an amplitude of a torque applied to the second gear 312 generated by the torsional element 352.

It is also understood that as an alternative to the embodiments of the invention described herein, a variation of the torsional compensating device 300 including four joint assemblies, in which a joint actuator moves a shaft portion of the torsional compensating device in a manner parallel to a main shaft, is within the scope of the present invention.

In use, the torsional compensating device 100, 200, 300 generates a torque using the torsional element 110, 234, 352 and at least one of the joint assemblies 104, 108, 204, 230, 340, 344, 348 to damp a torque ripple produced by the internal combustion engine 116, 216, 316. The torsional compensating device 100, 200, 300 is a parallel, torque additive device for the internal combustion engine 116, 216, 316.

To ensure that a torque generated by the torsional compensating device 100, 200, 300 is correcting the torque ripple produced by the internal combustion engine 116, 216, 316 and not increasing the torque ripple produced by the internal combustion engine 116, 216, 316, a phase at which the torsional compensating device 100, 200, 300 operates at must be set to a correct value. A phase at which the torsional compensating device 100, 200, 300 operates at may be adjusted dynamically or may be set by a design and orientation of the torsional compensating device 100, 200, 300 in applications in which dynamic phase adjustment is not necessary. When a design and orientation of the torsional compensating device 100, 200, 300 determines a phase, a position of the torsional compensating device 100, 200, 300 with respect to a crankshaft angle of the internal combustion engine 116, 216, 316 determined the phase. The position of the torsional compensating device 116, 216, 316 is determined by a position of a plane formed by the joint assemblies 104, 108, 204, 230, 340, 344, 348 compared to a plane of the crankshaft of the internal combustion engine 116, 216, 316. As a non-limiting example, if the plane formed by the joint assemblies 104, 108, 204, 230, 340, 344, 348 is the same as a plane of a plurality of pistons of the internal combustion engine 116, 216, 316, the torsional compensating device 100, 200, 300 will have a phase substantially equal to 0 degrees, while placing the plane formed by the joint assemblies 104, 108, 204, 230, 340, 344, 348 inclined compared to the plane of a plurality of pistons will create some de-phasing.

A phase at which the torsional compensating device 100, 200, 300 operates at may be adjusted dynamically. A first way in which a phase of the torsional compensating device 200 may be adjusted dynamically during the operation of the torsional compensating device 200 is through the operation of the clutching device 232. As described hereinabove, by disengaging the clutching device 232, the clutching device 232 is placed in a "slipping" condition. When the clutching device 232 is placed in a "slipping" condition, the relationship between the second joint assembly 230 and the torsional element 234 is adjusted, resulting in an adjustment to a phase of the torsional compensating device 200.

Figure 6A:
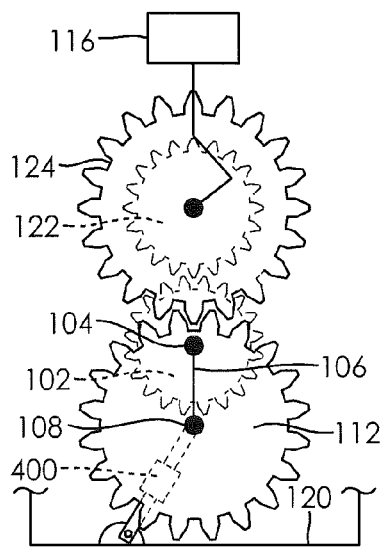
FIG. 6A is a schematic illustration of the torsional compensating device shown in FIG. 3 in a non-rotated position.
Figure 6B:
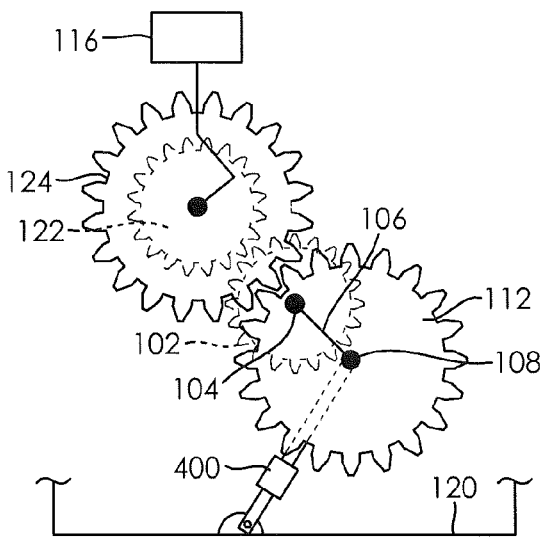
FIG. 6B is a schematic illustration of the torsional compensating device shown in FIG. 3 in a rotated position.

A second way in which a phase of the torsional compensating device 100, 200, 300 may be adjusted dynamically during the operation of the torsional compensating device 100, 200, 300 is through rotation of the torsional compensating device 100, 200, 300 about the main shaft 114, 214, 314. FIGS. 6A and 6B illustrates the torsional compensating device 100 in both a non-rotated position and a rotated position. It is understood that the torsional compensating device 200, 300 may be rotated similarly. A phase actuator 400 facilitates rotating the torsional compensating device 100 about the main shaft 114. In rotating the torsional compensating device 100 about the main shaft 114, the plane formed by the joint assemblies 104, 108 is adjusted from the plane of a plurality of pistons of the internal combustion engine 116. By rotating the torsional compensating device 100, a de-phasing occurs between a torque generated by the torsional compensating device 100 and the torque ripple produced by the internal combustion engine 116. It is understood that rotating the torsional compensating device 100, 200, 300 may be performed prior to operation of the internal combustion engine 116, 216, 316, performed dynamically during operation of the internal combustion engine 116, 216, 316, or incorporated into a fixed design of the torsional compensating device 100, 200, 300.

It is also understood that as an alternative to the embodiments of the invention described herein, it is within the scope of the present invention for alternative drive ratios to be incorporated into the torsional compensating device 100, 200, 300. As described hereinabove, a gear ratio of 1:1 between the first geared portion 122, 222, 322 and the first gear 102, 202, 302 and the second geared portion 124, 224, 324 and the second gear 112, 212, 312 is useful to damp second order torque ripples produced by the internal combustion engine 116, 216, 316, as joint assemblies 104, 108, 204, 230, 340, 344, 348 introduce a second order speed oscillation. Such a gear ratio is useful for a four cylinder engine, in which a biggest torque ripple occurs at the second order. As a non-limiting example, a gear ratio of 1:1.5 between the first geared portion 122, 222, 322 and the first gear 102, 202, 302 and the second geared portion 124, 224, 324 and the second gear 112, 212, 312 is also useful. In such a variation, the first gear 102, 202, 302 would be driven one and a half times as fast as the main shaft 114, 214, 314, and torque corrections generated by the torsional compensating device 100, 200, 300 would occur at the third order. Torque corrections occurring at the third order could be used to damp a torque ripple of the internal combustion engine 116, 216, 316 having three cylinders, and thus a torque ripple that occurs three times every two turns.

As described hereinabove, it is within the scope of the present invention for the torsional compensating device 100, 200, 300 to include a single non-homokinetic joint as one of the joint assemblies 104, 108, 204, 230, 340, 344, 348. A remaining joint assembly 104, 108, 204, 230 or joint assemblies 340, 344, 348 would be a homokinetic joint as described hereinabove. Such a torsional compensating device 100, 200, 300 would be useful in applications in which torque ripples produced by the internal combustion engine 116, 216, 316 are relatively small. An amplitude of torque peaks created by such a torsional compensating device 100, 200, 300 would be smaller than a torsional compensating device 100, 200, 300 including two non-homokinetic joints.

Based on the foregoing, it can be appreciated that the torsional compensating device 100, 200, 300 described and depicted herein has several advantages over the known art. Some of the advantages of the torsional compensating device 100, 200, 300 include, but are not limited to, the torsional compensating device 100, 200, 300 that can be actively regulated in phase and amplitude and the torsional compensating device 100, 200, 300 is formed from common and cost effective components. Additionally, the torsional compensating device 100, 200, 300 is a configurable design, which affords significant flexibility through a selection of the torsional element 110, 234, 352 and an angle of the joint assemblies 104, 108, 204, 230, 340, 344, 348. Further, the torsional compensating device 100, 200, 300 is a parallel additive torque device which does not dissipate an excessive amount of energy through frictional losses or through damping.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A parallel, torque additive torsional compensating device for drivingly engaging an output shaft of an internal combustion engine, the torsional compensating device comprising:
   a first gear in driving engagement with a first engagement portion of the output of the internal combustion engine;
   a first joint assembly in driving engagement with the first gear;
   an intermediate shaft in driving engagement with the first joint assembly;
   a second joint assembly in driving engagement with the intermediate shaft;
   a torsional element in driving engagement with the second joint assembly; and
   a second gear in driving engagement with the torsional element and a second engagement portion of the output of the internal combustion engine, wherein an angular deviation of at least one of the first joint assembly and the second joint assembly causes a cyclical acceleration of the torsional element, the cyclical acceleration of the torsional element applying a torque to the output of the internal combustion engine through the second gear and the second engagement portion.

2. The torsional compensating device of claim 1, wherein the torsional element is oriented substantially parallel to the output of the internal combustion engine.

3. The torsional compensating device of claim 1, wherein the first joint assembly is a Cardan joint assembly.

4. The torsional compensating device of claim 1, further comprising a clutching device in driving engagement with one of the output of the internal combustion engine, the first joint assembly, and the torsional element and a remaining one of the output of the internal combustion engine, the first joint assembly, and the torsional element.

5. The torsional compensating device of claim 4, wherein the clutching device is a clutching device which may be variably engaged.

6. The torsional compensating device of claim 4, wherein the clutching device is in driving engagement with the first joint assembly and the torsional element.

7. The torsional compensating device of claim 1, wherein the first joint assembly and the second joint assembly are Cardan joint assemblies.

8. The torsional compensating device of claim 1, further comprising a third joint assembly, the third joint in driving engagement with the first joint assembly and the second joint assembly.

9. The torsional compensating device of claim 8, further comprising a first intermediate shaft in driving engagement with the first joint assembly and the third joint assembly and a second intermediate shaft in driving engagement with the second joint assembly and the third joint assembly.

10. The torsional compensating device of claim 9, further comprising a joint actuator, the joint actuator positioning the third joint assembly to adjust an angular deviation between the first joint assembly and the third joint assembly.

11. The torsional compensating device of claim 9, wherein the first intermediate shaft and the second intermediate shaft are telescoping shafts.

12. The torsional compensating device of claim 1, wherein the torsional element is one of a torsion bar and a torsion spring.

13. A parallel, torque additive torsional compensating device for drivingly engaging an output shaft of an internal combustion engine, the torsional compensating device comprising:
 a first gear in driving engagement with a first engagement portion of the output of the internal combustion engine;
 a first Cardan joint assembly in driving engagement with the first gear;
 an intermediate shaft in driving engagement with the first joint assembly;
 a second joint assembly in driving engagement with the intermediate shaft;
 a torsional element in driving engagement with the first second joint assembly, the torsional element oriented substantially parallel to the output of the internal combustion engine; and
 a second gear in driving engagement with the torsional element and a second engagement portion of the output of the internal combustion engine, wherein an angular deviation of at least one of the first Cardan joint assembly and the second joint assembly causes a cyclical acceleration of the torsional element, the cyclical acceleration of the torsional element applying a torque to the output of the internal combustion engine through the second gear and the second engagement portion.

14. The torsional compensating device of claim 13, further comprising a clutching device, the clutching device in driving engagement with one of the output of the internal combustion engine, the first Cardan joint assembly, and the torsional element and a remaining one of the output of the internal combustion engine, the first Cardan joint assembly, and the torsional element.

15. The torsional compensating device of claim 13, wherein the second joint assembly is a second Cardan joint assembly.

\* \* \* \* \*